United States Patent Office 2,738,325
Patented Mar. 13, 1956

2,738,325

METHOD OF TREATING WATER INTRODUCED INTO UNDERGROUND FORMATIONS

Robert G. Rydell, Wheaton, Ill., assignor to National Aluminate Corporation, Chicago, Ill., a corporation of Delaware No Drawing. Application April 8, 1954,
Serial No. 421,959

8 Claims. (Cl. 252—8.55)

This invention relates to a method of treating water introduced into underground formations, and more particularly to a method of treating water which is forced into the producing formation in the secondary recovery of oil or in the disposal of waste water and brines from oil and gas wells.

When an oil well ceases to flow by the natural pressure in the formation and/or substantial quantities of oil can no longer be obtained by the usual pumping methods, various processes are sometimes used for the treatment of the oil-bearing formation in order to increase the flow of oil. These processes are usually described as secondary recovery processes. One such process which is used quite frequently is the water flooding process wherein water is pumped under pressure into what is called an "injection well" and oil, along with quantities of water, that have been displaced from the formation, are pumped out of an adjacent well usually referred to as a "producing well." The oil which is pumped from the producing well is then separated from the water that has been pumped from the producing well and the water is pumped to a storage reservoir from which it can again be pumped into the injection well. Supplementary water from other sources may also be used in conjunction with the produced water. When the storage reservoir is open to the atmosphere and the oil is subject to aeration, this type of water flooding system is referred to herein as an "open water flooding system." If the water is recirculated in a closed system without substantial aeration, the secondary recovery method is referred to herein as a "closed water flooding system."

The water which is introduced into the injection wells may vary considerably in composition from one field to another. Frequently it contains relatively large quantities of dissolved salts such as sodium chloride and therefore can be described as a brine. It may also contain other salts such as those of calcium, magnesium, barium and strontium. Some iron salts may likewise be present. In some cases these salts are added to a fresh water to prevent clay minerals from swelling and sealing off porous oil sands, but in most instances their occurrence is natural.

Some of the difficulties heretofore encountered in water flooding operations are the plugging of surface equipment, injection wells and formation due to numerous factors but particularly because of the formation of insoluble salts in the system and on the face of the formation, the growth of micro-organisms which form solids that tend to plug the equipment and formation and the corrosion of equipment used in the system with the attendant formation of products of corrosion which tend to plug the formation. The plugging of the formation makes it necessary to use increased pressures in order to force the water into the injection wells and this in turn greatly increases the cost of secondary oil recovery operations by water flooding methods, making such methods impractical in many instances. The corrosion problem also makes it necessary to replace the equipment at frequent intervals thereby increasing the cost of the secondary oil recovery operation.

Attempts have been made to prevent plugging of the wells and corrosion of the system by chemical treatment with various types of materials and some success has been attained along these lines. The solution of the problem, however, has been especially difficult in open water flooding systems where aeration occurs and therefore oxygen is present. The oxygen content in the water or brines used in such open water flooding systems varies from complete air saturation to lesser amounts. However, any substantial amounts of dissolved oxygen in the water or brines that are injected into the injection well adds to the difficulty of solving the problem. Thus, chemical reagents which are effective at least to some extent in improving the operation of a closed water flooding system may have no significant effect in an open water flooding system.

Some substances which are suitable for preventing corrosion in waters with low concentrations of dissolved solids do not afford adequate corrosion protection in brines and especially brines containing dissolved oxygen. The polyphosphates represent a class of such substances which are known to inhibit corrosion but are not too effective, particularly against localized corrosive attacks of ferrous metals, when used in brines having a relatively high concentration of sodium chloride. The polyphosphates also suffer from the objection that under the conditions present in an oil-bearing formation they can undergo reversion to orthophosphates which in turn form insoluble salts with calcium, magnesium, barium and strontium. Calcium and magnesium are usually present in substantial amounts in oil-bearing formations and barium and strontium salts are often present in smaller amounts. The formation of insoluble salts as previously indicated would tend to plug the oil-bearing strata and reduce the chances of obtaining an improvement in the recovery of the oil.

One of the objects of the present invention is to provide a new and improved method for the treatment of water which is injected into underground formations.

Another object of the invention is to provide a new and improved method of preventing corrosion of metal surfaces which are brought into contact with water that is normally corrosive.

Still a further object of the invention is to provide a new and improved method for protecting the equipment employed in secondary oil recovery by water flooding, especially injection wells, transmission lines, filters, meters and storage tanks.

An additional object of the invention is to provide a method of improving the operation of open water flooding systems in the secondary recovery of oil.

Another object of the invention is to improve the disposal of waste waters, including brines, from oil and gas producing formations where such waters are returned to the ground through disposal wells.

Another object of the invention is to provide a new and improved method of chemically treating water or brines which are forced into oil-bearing formations that serves not only to reduce corrosion of equipment in the injection wells but also prevents or reduces deposits and plugging caused by micro-organisms. Other objects will appear hereinafter.

In accomplishing these objects in accordance with this invention it has been found that new and improved results in introducing water in underground formations are obtained by treating the water with a fraction of a per cent by weight, preferably 0.5 to 100 parts per million, of a quaternary imidazolinium salt, water soluble in the concentrations employed and the anion of which forms water soluble calcium, magnesium, barium and strontium salts in the concentrations employed. The compounds which are especially useful for the practice of the invention are water soluble quaternary imidazolinium nitrites. Other examples of quaternary imidazolinium salts which can be employed for the practice of the invention are the quaternary imidazolinium chlorides, bromides, iodides, nitrates, bicarbonates, acetates, salicylates, benzoates, cinnamates and propionates.

Especially advantageous results have been obtained by the employment of 1-(2-hydroxyethyl)-1-benzyl-2-tridecyl imidazolinium nitrite having the following structural formula

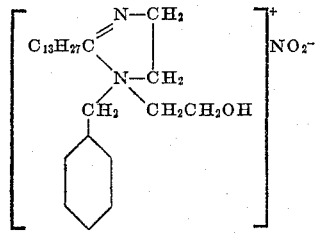

In general, the preferred compounds employed in the practice of the invention can be characterized by the general formula

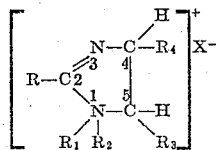

in which R, $R_1$, $R_2$, $R_3$ and $R_4$ are organic groups of the same or different kinds and X is an anion which may be either organic or inorganic and forms water soluble calcium, strontium, barium and magnesium salts in the concentrations at which the compounds are used. In the preferred compounds, one of the radicals R, $R_1$ and $R_2$ is an aliphatic group containing 8 to 36 carbon atoms in an acyclic carbon chain (e. g., octyl, nonyl, decyl, undecyl, dodecyl, undecenyl, tridecyl, tetradecyl, pentadecyl, hexadecyl, oleyl, octadecyl, erucyl, melissyl, hydroxy dodecyl, hydroxy stearyl, ricinoleyl and polymeric radicals derived by the polymerization of materials containing olefinic double bonds). One of the radicals $R_1$ and $R_2$ is preferably an alkyl group (e. g., methyl, ethyl, propyl, butyl, or higher homologues) or an alicyclic group in which the aliphatic portion of the radical is an acyclic hydrocarbon group (e. g., benzyl, cinnamyl, and homologues thereof), the other of said radicals being a lower aliphatic radical containing not more than 6 carbon atoms (e. g., methyl, ethyl, propyl, butyl, isopropyl, isobutyl, amyl, isoamyl, hexyl, hydroxy ethyl, hydroxy propyl, hydroxy butyl, $-C_2H_4NH_2$, $-C_2H_4NHC_2H_4NH_2$, $-C_2H_4NHC_2H_4NHC_2H_4NH_2$, $-C_3H_6NH_2$, $-C_3H_6NHC_3H_6NH_2$, and homologues thereof). The radicals $R_3$ and $R_4$ are preferably hydrogen or lower alkyl radicals containing not more than 6 carbon atoms (e. g., methyl, ethyl, propyl, isopropyl, butyl, isobutyl, amyl, isoamyl, and hexyl).

The invention will be further illustrated but is not limited by the following examples in which the quantities are stated in parts by weight unless otherwise indicated.

EXAMPLE I

In a particular oil field in which an open water flooding system was used for the secondary recovery of oil, fresh water from a small natural lake was mixed with reservoir brine water that contained large amounts of sodium chloride dissolved therein.

Approximately 9 parts per million of a composition having the following formula was added to the fresh water supply:

| | Percent |
|---|---|
| 1 - (2 - hydroxyethyl) - 1 - benzyl - 2 - tridecyl imidazolinium nitrite | 10 |
| Water | 70 |
| Isopropyl alcohol | 20 |

Sufficient chlorine was added at about the same point to give a residual chlorine content of 0.1 to 0.2 part per million $Cl_2$. The water was then piped underground through a 8 to 10 inch pipeline for approximately 7 miles and run into the brine reservoir. Brine which had been previously pumped out of the oil formation was run into the same reservoir at about the same rate. A 1:1 mixture of fresh water and produced waters was pumped from the reservoir to the aerator. From the aerator the water was pumped to an Accelator (a sludge blanket type precipitator). A by-pass was provided around the aerator so that the water could be by-passed directly to the Accelator except when the dissolved iron content was high. The aerator was not used in the particular operation herein described.

Before reaching the Accelator the water was again chlorinated. In the Accelator 300 to 500 pounds of lime were added daily. The pH of the water at the Accelator was raised to about 9.1 for manganese and iron removal.

After leaving the Accelator the water was filtered through anthracite beds. The filter effluent was treated with 8 parts per million of the previously described treating composition and piped to the injection pumphouse. The water was then distributed to various meter groups and from there to the injection wells.

The water was forced into the injection wells under pressure and produced brines which were displaced from the oil-bearing formation were pumped from the producing wells to an oil dehydrator where the oil was separated and passed to storage. The brine was passed to a skim pit where scummy deposits were removed from the surface and then the water was returned to the reservoir. The reservoir was open at the top and the brine was introduced a substantial distance above the surface level to aid in the partial removal of dissolved gases existing at supersaturated concentrations. An analysis of the water at various stages of the system is given in the following table:

Table

| | Concentrations in Parts Per Million | | | | |
|---|---|---|---|---|---|
| | Lake Water | Filter Effluent | Reservoir Water | Injection Water | Produced Brine |
| Total dissolved solids | 122 | 39,900 | 37,600 | 38,000 | 67,000 |
| Total Hardness (as $CaCO_3$) | 68 | 6,400 | 6,500 | 6,800 | 11,600 |
| Calcium Hardness (as $CaCO_3$) | 44 | 4,100 | 4,200 | 4,400 | 7,200 |
| Magnesium Hardness (as $CaCO_3$) | 24 | 2,300 | 2,300 | 2,400 | 4,400 |
| "P" Alkalinity (as $CaCO_3$) | 0 | 0 | 0 | 0 | 0 |
| Total (MO) alkalinity (as $CaCO_3$) | 44 | 52 | 56 | 50 | 60 |
| Free $CO_2$ (as $CaCO_3$) | Trace | Trace | 40 | Trace | 28 |
| Chloride (as NaCl) | 10 | 35,000 | 36,200 | 36,200 | 64,000 |
| Sulfate (as $Na_2SO_4$) | 59 | 21 | 24 | 19 | 0 |
| Silica ($SiO_2$) | 3 | 4 | 2 | 1 | 2 |
| Iron (as Fe) | 0.3 | 0.9 | 4.9 | 0.8 | 7.6 |
| Ba and Sr (as their combined sulfates) | 0 | 320 | 330 | 310 | 570 |
| Mn | 0.3 | 1.2 | 1.2 | 0.9 | Trace |
| Dissolved Oxygen | 7.8 | 6.0 | | 6.0 | |
| pH | 7.10 | 7.30 | 6.50 | 7.50 | 6.70 |

Over a period of two weeks, feeding the above identified composition at a rate of 9 parts per million to the fresh water supply and 8 to 10 parts per million to the effluent from the filter, two small steel coupons were suspended at the injection caps of each of 8 wells. The highest corrosion rate shown by any of the coupons was 3.0 mils per year with other rates between 1.3 and 1.5 mils per year. Six of these wells showed no corrosion. Without the treatment the corrosion rate on the equipment was relatively high and exceeded 10 mils per year.

In a previous treatment the fresh water was treated with 9 parts per million of a polyphosphate. This stabilized the iron while going through the Accelator and thus prevented its removal. In the treatment herein described the imidazolinium nitrite alone prevented corrosion of metals in the fresh water part of the system as well as in the other parts of the system where the metallic equipment was exposed to brines and oil. The corrosion rate with the polyphosphate was about 9 mils per year as compared with 0 to 3 mils per year with the imidazolinium nitrite. Additionally, the imidazolinium nitrite prevented microbiological growth of substances which would tend to form solid deposits in the oil producing formation.

EXAMPLE II

In order to further evaluate this invention the composition shown in Example I was used to treat the flood water of another secondary oil recovery system. The water used was obtained from a river and was pumped into the injection system at a rate of about 2,000 barrels per day. Before use the water was treated with lime and alum after which it was filtered and chlorinated. An analysis of the raw river water showed the following composition.

| | | |
|---|---|---|
| Total dissolved solids | parts per million | 334 |
| Total hardness (as $CaCO_3$) | do | 184 |
| Calcium hardness (as $CaCO_3$) | do | 128 |
| Magnesium hardness (as $CaCO_3$) | do | 56 |
| Phenolphthalein alkalinity (as $CaCO_3$) | do | 2 |
| Total alkalinity (as $CaCO_3$) | do | 92 |
| Chloride (as NaCl) | do | 96 |
| Sulfate (as $Na_2SO_4$) | do | 133 |
| Orthophosphate (as $PO_4$) | do | 0.2 |
| Total phosphate (as $PO_4$) | do | 0.2 |
| Silica (as $SiO_2$) | do | 2 |
| Iron (as Fe) | do | 0.2 |
| pH | | 8.10 |

The water was saturated with air and was extremely corrosive to the injection lines. Prior to using a composition of the present invention polyphosphates were employed with but little success. Test specimens placed in the injection lines showed corrosion rates of 0.015 to 0.030 inch per year.

The composition shown in Example I was fed at the rate of 20 parts per million for the first three days of the test and at 10 parts per million for the remainder of the 3 week test. At the end of the period the specimens showed a corrosion rate of 0.004 inch per year.

In the foregoing examples the isopropyl alcohol acts as a partial solvent and is also added to keep the composition from freezing before it is used. Other organic solvents and carriers can be used provided the quaternary imidazolinium salt is soluble therein. Examples of such solvents are alcohols (e. g., methyl alcohol, ethyl alcohol), glycols (e. g., ethylene glycol, diethylene glycol), ketones (e. g., acetone) and dioxane.

Instead of the 1-(2-hydroxyethyl)-1-benzyl-2-tridecyl imidazolinium nitrite, the following compounds can be employed in the practice of the invention in accordance with the general procedures previously described:

1-(2-hydroxyethyl)-1-benzyl-2-tridecyl imidazolinium nitrate 1-(2-hydroxyethyl)-1-benzyl-2-tridecyl imidazolinium bromide 1-(2-hydroxyethyl)-1-benzyl-2-tridecyl imidazolinium chloride 1-(2-hydroxyethyl)-1-benzyl-2-tridecyl imidazolinium iodide 1-(2-hydroxyethyl)-1-benzyl-2-tridecyl imidazolinium bicarbonate 1-(2-hydroxyethyl)-1-benzyl-2-tridecyl imidazolinium salicylate 1-(2-hydroxyethyl)-1-benzyl-2-tridecyl imidazolinium benzoate 1-(2-hydroxyethyl)-1-benzyl-2-tridecyl imidazolinium cinnamate 1-(2-hydroxyethyl)-1-benzyl-2-tridecyl imidazolinium propionate 1-(2-aminoethyl)-1-benzyl-2-tridecyl imidazolinium nitrite 1-(2-aminoethyl)-1-benzyl-2-tridecyl imidazolinium bromide 1-(2-aminoethyl)-1-benzyl-2-tridecyl imidazolinium chloride 1-(2-aminoethyl)-1-benzyl-2-tridecyl imidazolinium iodide 1-(2-aminoethyl)-1-benzyl-2-tridecyl imidazolinium bicarbonate 1-(2-aminoethyl)-1-benzyl-2-tridecyl imidazolinium salicylate 1-(2-aminoethyl)-1-benzyl-2-tridecyl imidazolinium benzoate 1-(2-aminoethyl)-1-benzyl-2-tridecyl imidazolinium cinnamate 1-(2-aminoethyl)-1-benzyl-2-tridecyl imidazolinium propionate 1-(2-hydroxyethyl)-1-benzyl-2-heptadecenyl imidazolinium nitrite 1-(2-hydroxyethyl)-1-benzyl-2-heptadecenyl imidazolinium bromide 1-(2-hydroxyethyl)-1-benzyl-2-heptadecenyl imidazolinium chloride 1-(2-hydroxyethyl)-1-benzyl-2-heptadecenyl imidazolinium iodide 1-(2-hydroxyethyl)-1-benzyl-2-heptadecenyl imidazolinium bicarbonate 1-(2-hydroxyethyl)-1-benzyl-2-heptadecenyl imidazolinium salicylate 1-(2-hydroxyethyl)-1-benzyl-2-heptadecenyl imidazolinium benzoate 1-(2-hydroxyethyl)-1-benzyl-2-heptadecenyl imidazolinium cinnamate 1-(2-hydroxyethyl)-1-benzyl-2-heptadecenyl imidazolinium propionate 1-(2-aminoethyl)-1-benzyl-2-heptadecenyl imidazolinium nitrite 1-(2-aminoethyl)-1-benzyl-2-heptadecenyl imidazolinium bromide 1-(2-aminoethyl)-1-benzyl-2-heptadecenyl imidazolinium chloride 1-(2-aminoethyl)-1-benzyl-2-heptadecenyl imidazolinium iodide 1-(2-aminoethyl)-1-benzyl-2-heptadecenyl imidazolinium bicarbonate 1-(2-aminoethyl)-1-benzyl-2-heptadecenyl imidazolinium salicylate 1-(2-aminoethyl)-1-benzyl-2-heptadecenyl imidazolinium benzoate 1-(2-aminoethyl)-1-benzyl-2-heptadecenyl imidazolinium cinnamate 1-(2-aminoethyl)-1-benzyl-2-heptadecenyl imidazolinium propionate 1-(aminoethyl iminoethyl)-1-benzyl-2-tridecyl imidazolinium nitrite 1-(aminoethyl iminoethyl)-1-benzyl-2-tridecyl imidazolinium bromide 1-(aminoethyl iminoethyl)-1-benzyl-2-tridecyl imidazolinium chloride -(aminoethyl iminoethyl)-1-benzyl-2-tridecyl imidazolinium bicarbonate
-(aminoethyl iminoethyl)-1-benzyl-2-tridecyl imidazolinium salicylate
-(aminoethyl iminoethyl)-1-benzyl-2-tridecyl imidazolinium benzoate
-(aminoethyl iminoethyl)-1-benzyl-2-tridecyl imidazolinium cinnamate
-(aminoethyl iminoethyl)-1-benzyl-2-tridecyl imidazolinium propionate
-(aminoethyl iminoethyl)-1-benzyl - 2 - heptadecenyl imidazolinium nitrite
-(aminoethyl iminoethyl)-1-benzyl - 2 - heptadecenyl imidazolinium bromide
-(aminoethyl iminoethyl)-1-benzyl - 2 - heptadecenyl imidazolinium chloride
-(aminoethyl iminoethyl)-1-benzyl - 2 - heptadecenyl imidazolinium iodide
(-aminoethyl iminoethyl)-1-benzyl - 2 - heptadecenyl imidazolinium bicarbonate
-(aminoethyl iminoethyl)-1-benzyl - 2 - hetapdecenyl imidazolinium salicylate
-(aminoethyl iminoethyl)-1-benzyl - 2 - heptadecenyl imidazolinium benzoate
-(aminoethyl iminoethyl)-1-benzyl - 2 - heptadecenyl imidazolinium cinnamate
!-(aminoethyl iminoethyl)-1-benzyl - 2 - heptadecenyl imidazolinium proprionate
!-(2-hydroxyethyl) - 1 - methyl - 2 - tridecyl imidazolinium nitrite
!-(2-hydroxyethyl) - 1 - methyl - 2 - tridecyl imidazolinium bromide
!-(2-hydroxyethyl) - 1 - methyl - 2 - tridecyl imidazolinium chloride
!-(2-hydroxyethyl) - 1 - methyl - 2 - tridecyl imidazolinium iodide
!-(2-hydroxyethyl) - 1 - methyl - 2 - tridecyl imidazolinium bicarbonate
!-(2-hydroxyethyl) - 1 - methyl - 2 - tridecyl imidazolinium salicylate
1-(2-hydroxyethyl) - 1 - methyl - 2 - tridecyl imidazolinium benzoate
1-(2-hydroxyethyl) - 1 - methyl - 2 - tridecyl imidazolinium cinnamate
1-(2-hydroxyethyl) - 1 - methyl - 2 - tridecyl imidazolinium propionate
1-(2-hydroxyethyl)-1-methyl - 2 - heptadencyl imidazolinium nitrite
1-(2-hydroxyethyl)-1-methyl - 2 - heptadecenyl imidazolinium bromide
1-(2-hydroxyethyl)-1-methyl - 2 - heptadecenyl imidazolinium chloride
1-(2-hydroxyethyl)-1-methyl - 2 - heptadecenyl imidazolinium iodide
1-(2-hydroxyethyl)-1-methyl - 2 - heptadecenyl imidazolinium bicarbonate
1-(2-hydroxyethyl)-1-methyl - 2 - heptadecenyl imidazolinium salicylate
1-(2-hydroxyethyl)-1-methyl - 2 - heptadecenyl imidazolinium benzoate
1-(2-hydroxyethyl)-1-methyl - 2 - heptadecenyl imidazolinium cinnamate
1-(2-hydroxyethyl)-1-methyl - 2 - heptadecenyl imidazolinium proprionate
1-(2-hydroxyethyl)-1-ethyl - 2 - tridecyl imidazolinium nitrite
1-(2-hydroxyethyl)-1-ethyl - 2 - tridecyl imidazolinium bromide
1-(2-hydroxyethyl)-1-ethyl - 2 - tridecyl imidazolinium chloride
1-(2-hydroxyethyl)-1-ethyl - 2 - tridecyl imidazolinium bicarbonate
1-(2-hydroxyethyl)-1-ethyl - 2 - tridecyl imidazolinium iodide
1-(2-hydroxyethyl)-1-ethyl - 2 - tridecyl imidazolinium salicylate
1-(2-hydroxyethyl)-1-ethyl - 2 - tridecyl imidazolinium benzoate
1-(2-hydroxyethyl)-1-ethyl - 2 - tridecyl imidazolinium cinnamate
1-(2-hydroxyethyl)-1-ethyl - 2 - tridecyl imidazolinium proprionate
1-(2-hydroxyethyl)-1-ethyl - 2 - heptadecenyl imidazolinium nitrite
1-(2-hydroxyethyl)-1-ethyl - 2 - heptadecenyl imidazolinium bromide
1-(2-hydroxyethyl)-1-ethyl - 2 - heptadecenyl imidazolinium chloride
1-(2-hydroxyethyl)-1-ethyl - 2 - heptadecenyl imidazolininum iodide
1-(2-hydroxyethyl)-1-ethyl - 2 - heptadecenyl imidazolinium bicarbonate
1-(2-hydroxyethyl)-1-ethyl - 2 - heptadecenyl imidazolinium salicylate
1-(2-hydroxyethyl)-1-ethyl - 2 - heptadecenyl imidazolinium benzoate
1-(2-hydroxyethyl)-1-ethyl - 2 - heptadecenyl imidazolinium cinnamate
1-(2-hydroxyethyl)-1-ethyl - 2 - heptadecenyl imidazolinium propionate
1-(2-hydroxyethyl)-1-cyclohexyl - 2 - tridecyl imidazolinium nitrite
1-(2-hydroxyethyl)-1-cyclohexyl - 2 - tridecyl imidazolinium bromide
1-(2-hydroxyethyl)-1-cyclohexyl - 2 - tridecyl imidazolinium chloride
1-(2-hydroxyethyl)-1-cyclohexyl - 2 - tridecyl imidazolinium iodide
1-(2-hydroxyethyl)-1-cyclohexyl - 2 - tridecyl imidazolinium bicarbonate
1-(2-hydroxyethyl)-1-cyclohexyl - 2 - tridecyl imidazolinium salicylate
1-(2-hydroxyethyl)-1-cyclohexyl - 2 - tridecyl imidazolinium benzoate
1-(2-hydroxyethyl)-1-cyclohexyl - 2 - tridecyl imidazolinium cinnamate
1-(2-hydroxyethyl)-1-cyclohexyl - 2 - tridecyl imidazolinium propionate
1-(2-hydroxyethyl)-1-cyclohexyl - 2 - heptadecenyl imidazolinium nitrite
1-(2-hydroxyethyl)-1-cyclohexyl - 2 - heptadecenyl imidazolinium bromide
1-(2-hydroxyethyl)-1-cyclohexyl - 2 - heptadecenyl imidazolinium chloride
1-(2-hydroxyethyl)-1-cyclohexyl - 2 - heptadecenyl imidazoline iodide
1-(2-hydroxyethyl)-1-cyclohexyl - 2 - heptadecenyl imidazolinium bicarbonate
1-(2-hydroxyethyl)-1-cyclohexyl - 2 - heptadecenyl imidazolinium salicylate
1-(2-hydroxyethyl)-1-cyclohexyl - heptadecenyl imidazolinium benzoate
1-(2-hydroxyethyl)-1-cyclohexyl - 2 - heptadecenyl imidazolinium cinnamate
1-(2-hydroxyethyl)-1-cyclohexyl - 2 - heptadecenyl imidazolinium propionate
1,1-dimethyl-2-tridecyl imidazolinium nitrite
1,1-dimethyl-2-tridecyl imidazolinium bromide
1,1-dimethyl-2-tridecyl imidazolinium chloride
1,1-dimethyl-2-tridecyl imidazolinium bicarbonate
1,1-dimethyl-2-tridecyl imidazolinium iodide
1,1-dimethyl-2-tridecyl imidazolinium salicylate
1,1-dimethyl-2-tridecyl imidazolinium benzoate
1,1-dimethyl-2-tridecyl imidazolinium cinnamate
1,1-dimethyl-2-tridecyl imidazolinium propionate
1,1-dimethyl-2-heptadecenyl imidazolinium nitrite
1,1-dimethyl-2-heptadecenyl imidazolinium bromide
1,1-dimethyl-2-heptadecenyl imidazolinium chloride 1,1-dimethyl-2-heptadecenyl imidazolinium iodide
1,1-dimethyl-2-heptadecenyl imidazolinium bicarbonate
1,1-dimethyl-2-heptadecenyl imidazolinium salicylate
1,1-dimethyl-2-heptadecenyl imidazolinium benzoate
1,1-dimethyl-2-heptadecenyl imidazolinium cinnamate
1,1-dimethyl-2-heptadecenyl imidazolinium propionate
1,1-diethyl-2-tridecyl imidazolinium nitrite
1,1-diethyl-2-tridecyl imidazolinium bromide
1,1-diethyl-2-tridecyl imidazolinium chloride
1,1-diethyl-2-tridecyl imidazolinium bicarbonate
1,1-diethyl-2-tridecyl imidazolinium iodide
1,1-diethyl-2-tridecyl imidazolinium salicylate
1,1-diethyl-2-tridecyl imidazolinium benzoate
1,1-diethyl-2-tridecyl imidazolinium cinnamate
1,1-diethyl-2-tridecyl imidazolinium propionate
1,1-diethyl-2-heptadecenyl imidazolinium nitrite
1,1-diethyl-2-heptadecenyl imidazolinium bromide
1,1-diethyl-2-heptadecenyl imidazolinium chloride
1,1-diethyl-2-heptadecenyl imidazolinium iodide
1,1-diethyl-2-heptadecenyl imidazolinium bicarbonate
1,1-diethyl-2-heptadecenyl imidazolinium salicylate
1,1-diethyl-2-heptadecenyl imidazolinium benzoate
1,1-diethyl-2-heptadecenyl imidazolinium cinnamate
1,1-diethyl-2-heptadecenyl imidazolinium propionate The invention is especially valuable in controlling and preventing the formation of deposits which cause plugging in underground formations where aqueous solutions are injected into the formation. The compounds employed in the practice of the invention preform the dual function of preventing bacterial or algae growth and preventing or reducing corrosion on metal equipment, pipelines, and the like. At the same time, the compounds utilized in the practice of the invention do not produce insoluble precipitates in the formation which would defeat the purpose of secondary recovery operations. The compounds employed in the practice of the invention are water soluble, relatively non-toxic materials which are effective when employed in relatively small amounts.

The invention provides a simple and economical method for solving some of the difficult problems heretofore encountered in the secondary recovery of oil with a water flooding system. Similar to the water flooding system is the salt water disposal system. In many oil fields large volumes of water are produced and must be disposed of where water flooding operations are not in use or where the water flooding operations cannot handle the amount of produced water. Most states have laws restricting pollution of streams and/or land with produced waters and oil producers must then find some method of disposing of the waste produced salt water. In many instances therefore, the salt water is disposed of by injecting the water into permeable low-pressure strata below the fresh water level. The formation into which the water is injected is not the oil producing formation and this type of disposal is defined as salt water disposal or waste water disposal. The problems of plugging of the formation and corrosion of equipment are completely analogous to those encountered in the secondary recovery operation by water flooding and the present invention is equally applicable.

The invention is hereby claimed as follows:

1. In a process of injecting water into an underground formation, the step which comprises dissolving in said water a fraction of a per cent by weight of a quaternary imidazolinium salt soluble in the water and the anion of which forms soluble calcium, magnesium, barium and strontium salts in the concentrations employed.

2. In a process of injecting a brine into an underground formation, the step which comprises dissolving in said brine a fraction of a per cent by weight of a water soluble quaternary imidazolinium nitrite.

3. In a process of injecting a brine into an underground formation, the step which comprises dissolving in said brine a fraction of a per cent by weight of 1-(2-hydroxyethyl)-1-benzyl-2-tridecyl imidazolinium nitrite.

4. In a process of water flooding wherein water is injected into an underground formation, the step which comprises adding to the water a fraction of a per cent by weight of a quaternary imidazolinium salt having the general formula

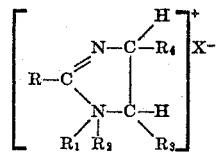

in which R is an aliphatic hydrocarbon group containing 8 to 36 carbon atoms, $R_1$ is a radical from the group consisting of alicyclic and alkyl groups in which an acyclic carbon atom is attached to the quaternary nitrogen atom, $R_2$ is a radical containing not more than 6 carbon atoms from the group consisting of hydrocarbon radicals, hydroxy hydrocarbon radicals and aminohydrocarbon radicals, $R_3$ and $R_4$ are from the group consisting of hydrogen and lower alkyl, and X is an anion forming a water soluble salt with calcium, barium, strontium and magnesium in the concentrations used.

5. In a process in which a brine containing dissolved oxygen is injected into an underground oil-bearing formation through an injection well and oil and produced brines are displaced from said formation into a production well, the step which comprises dissolving in the brine which is added to the injection well 0.5 to 100 parts per million of a quaternary imidazolinium salt soluble in the brine and the anion of which forms soluble calcium, magnesium, barium and strontium salts in the concentrations employed.

6. In a process in which a brine containing dissolved oxygen is injected into an underground oil-bearing formation through an injection well and oil and produced brines are displaced from said formation into a production well, the step which comprises dissolving in the brine which is added to the injection well 0.5 to 100 parts per million of 1-(2-hydroxyethyl)-1-benzyl-2-tridecyl imidazolinium nitrite.

7. A process of water-flooding which comprises injecting into an underground formation an aqueous solution consisting predominantly of water and containing minor amounts of water soluble inorganic salts and dissolved iron compounds together with a fraction of a per cent by weight of a quaternary imidazolinium salt having the general formula

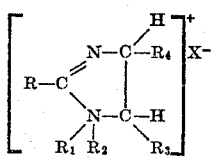

in which R is an aliphatic hydrocarbon group containing 8 to 36 carbon atoms, $R_1$ is a radical from the group consisting of alicyclic and alkyl groups in which an acyclic carbon atom is attached to the quaternary nitrogen atom, $R_2$ is a radical containing not more than 6 carbon atoms from the group consisting of hydrocarbon radicals, hydroxy hydrocarbon radicals and aminohydrocarbon radicals, $R_3$ and $R_4$ are from the group consisting of hydrogen and lower alkyl, and X is an anion forming a water soluble salt with calcium, barium, strontium and magnesium in the concentrations used.

8. A process of water-flooding which comprises injecting into an underground formation an aqueous solution consisting predominantly of water and containing minor amounts of water soluble inorganic salts and dissolved iron compounds together with 0.5 to 100 parts per million of 1-(2-hydroxyethyl)-1-benzyl-2-tridecyl imidazolinium nitrite.

(References on following page)

References Cited in the file of this patent

UNITED STATES PATENTS

| | | |
|---|---|---|
| 2,331,594 | Blair | Oct. 12, 1943 |
| 2,466,517 | Blair et al. | Apr. 5, 1949 |
| 2,468,163 | Blair et al. | Apr. 26, 1949 |
| 2,493,320 | Shonle et al. | Jan. 3, 1950 |
| 2,493,321 | Shonle et al. | Jan. 3, 1950 |
| 2,493,322 | Shonle et al. | Jan. 3, 1950 |

OTHER REFERENCES

Arquads Solve Costly Water Flood Problems—Advertisement in World Oil, April 1954, page 245.

Shock et al.: Prediction of Corrosion in Oil and Gas Wells, article in The Petroleum Engineer—Reference Annual, 1951, pages B86, B88, B90, B92, B94, B96 and B98.

Latter: Corrosion Control, article in World Oil, January 1951, Production Section, pages 141, 142 and 144.